(12) United States Patent
Imai et al.

(10) Patent No.: US 10,341,501 B2
(45) Date of Patent: Jul. 2, 2019

(54) MONITORING APPARATUS, MONITORING METHOD, AND RECORDING MEDIUM

(71) Applicant: SEIKO EPSON CORPORATION, Tokyo (JP)

(72) Inventors: Toshie Imai, Matsumoto (JP); Ryosuke Kakio, Matsumoto (JP); Kazuaki Naito, Matsumoto (JP); Masato Iguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/696,767

(22) Filed: Sep. 6, 2017

(65) Prior Publication Data

US 2018/0115654 A1 Apr. 26, 2018

(30) Foreign Application Priority Data

Oct. 25, 2016 (JP) .................................. 2016-208388

(51) Int. Cl.
*H04N 1/00* (2006.01)
*H04L 12/26* (2006.01)

(52) U.S. Cl.
CPC ......... *H04N 1/00037* (2013.01); *H04L 43/10* (2013.01); *H04N 1/00087* (2013.01); *H04N 1/00344* (2013.01); *H04N 1/00896* (2013.01); *H04L 43/067* (2013.01); *H04L 43/08* (2013.01); *H04L 43/16* (2013.01); *H04N 1/00061* (2013.01); *H04N 2201/0094* (2013.01)

(58) Field of Classification Search
USPC .................................................. 358/1.1–3.29
See application file for complete search history.

(56) References Cited

U.S. PATENT DOCUMENTS

| 8,213,811 | B2* | 7/2012 | Takatani ............ G03G 15/5004 399/8 |
| 2004/0125399 | A1* | 7/2004 | Kobayashi ............ G06F 1/3203 358/1.14 |
| 2007/0097424 | A1* | 5/2007 | Mizuno ................. G06F 1/3215 358/1.15 |
| 2011/0026062 | A1* | 2/2011 | Takatani ............. G06F 11/0757 358/1.13 |

FOREIGN PATENT DOCUMENTS

JP 2012-221193 A 11/2012

* cited by examiner

*Primary Examiner* — Marcellus J Augustin
(74) *Attorney, Agent, or Firm* — Workman Nydegger

(57) ABSTRACT

A monitoring apparatus which acquires, at a monitoring timing, device information which is a target of collection from a device includes a status information acquisition unit configured to acquire from the device, status information that includes information representing a power supply state of the device; and a monitoring interval setting unit configured to set a monitoring interval which is an interval of the monitoring timing in accordance with the power supply state denoted by the status information which has been acquired.

19 Claims, 13 Drawing Sheets

FIG. 5

STATUS INFORMATION 610

| | |
|---|---|
| NORMAL MODE/SLEEP MODE | (POWER SUPPLY STATE) |
| PRINTING/IDLE MODE | (OPERATION STATE) |
| UPDATING/STANDBY | (UPDATING STATE) |
| ...... | |

FIG. 6

DEVICE INFORMATION 620

| | |
|---|---|
| AMOUNT OF REMAINING INK | (AMOUNT OF REMAINING CONSUMABLES) |
| PERIOD OF USE OF ROLLER | (PERIOD OF USE OF CONSUMABLES) |
| MODEL NUMBER OF INK | (MODEL NUMBER OF CONSUMABLES) |
| THE NUMBER OF PRINT SHEETS | (USED FOR CHARGING) |
| ...... | |

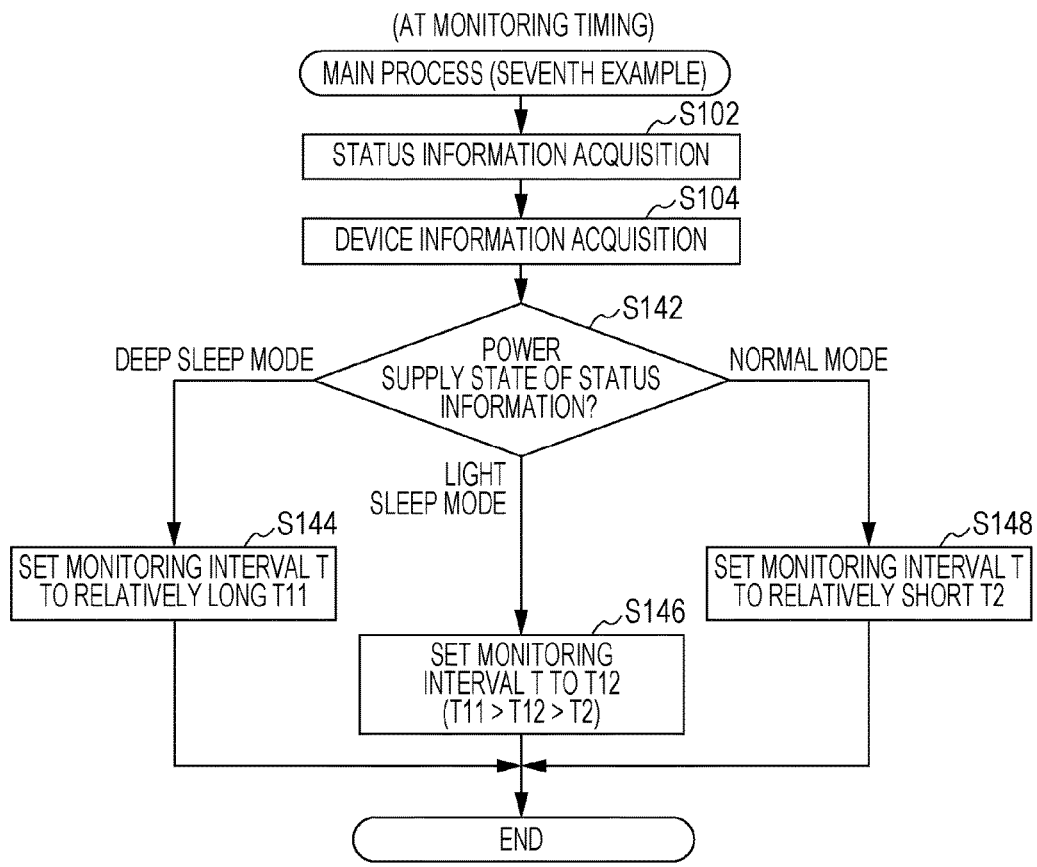

MONITORING APPARATUS, MONITORING METHOD, AND RECORDING MEDIUM

BACKGROUND

1. Technical Field

The present invention relates to a technique for obtaining device information from a device.

2. Related Art

It is common practice to connect, in addition to a server computer and a client computer, a device such as a printer, a scanner, a facsimile, or a multi-function device (an example of a multi-function apparatus) having printer, scanner, and facsimile functions over a network. To reduce power consumption of these devices, sleep mode (also referred to as power-saving mode) is enabled for low power consumption when the devices have not been used for a predetermined period. Moreover, in order to monitor the amount of remaining consumables such as ink of each device, a monitoring server is installed to collect device information. However, when device information needs to be collected from a device in sleep mode, the sleep mode of the device is terminated, and power consumption increases for device information collection.

JP-A-2012-221193 describes a problem that when a device in sleep mode polled by a server, the sleep mode of the device is terminated, thereby causing unnecessary power consumption. In the device management system described in JP-A-2012-221193, the polling frequency of a device in sleep mode is reduced by setting a large polling interval for a device with a low frequency of use on the basis of the frequency of use of client devices logged on to a server.

However, when setting the polling interval based on the frequency of use of the device, whether or not the device is in sleep mode is unknown. Thus, the device may be in sleep mode when polled, and in this case, electric power is unnecessarily consumed.

SUMMARY

An advantage of some aspects of the invention is to provide a technique enabling a reduction in power consumption by a device.

To achieve the advantage, an aspect of the present invention is a monitoring apparatus which acquires, at a monitoring timing, device information which is a target of collection from a device, the monitoring apparatus including: a status information acquisition unit configured to acquire from the device, status information that includes information representing a power supply state of the device; and a monitoring interval setting unit configured to set a monitoring interval which is an interval of the monitoring timing in accordance with the power supply state denoted by the status information which has been acquired.

Moreover, an aspect of the invention is a method for acquiring, at a monitoring timing, device information which is a target of collection from a device, the monitoring method comprising: acquiring from the device, status information that includes information representing a power supply state of the device; and setting a monitoring interval which is an interval of the monitoring timing in accordance with a power supply state denoted by the status information which has been acquired.

Furthermore, an aspect of the invention is a monitoring program for acquiring, at a monitoring timing, device information which is a target of collection from a device, the monitoring program causing a computer to realize a status information acquisition function of acquiring from the device, status information that includes information representing a power supply state of the device; and a monitoring interval setting function of setting a monitoring interval which is an interval of the monitoring timing in accordance with the power supply state denoted by the status information which has been acquired.

With the above-mentioned aspects, it is possible to provide a technique enabling a reduction in power consumption by a device.

BRIEF DESCRIPTION OF THE DRAWINGS

The invention will be described with reference to the accompanying drawings, wherein like numbers reference like elements.

FIG. 5 is a view schematically illustrating a configuration example of status information.

FIG. 6 is a view schematically illustrating a configuration example of device information.

FIG. 16 is a view schematically illustrating a configuration example of a process table including monitoring intervals set in accordance with a power supply state of the status information.

FIG. 17 is a flowchart illustrating a seventh example of the main process performed at the monitoring timing.

DESCRIPTION OF EXEMPLARY EMBODIMENTS

Figure 1:
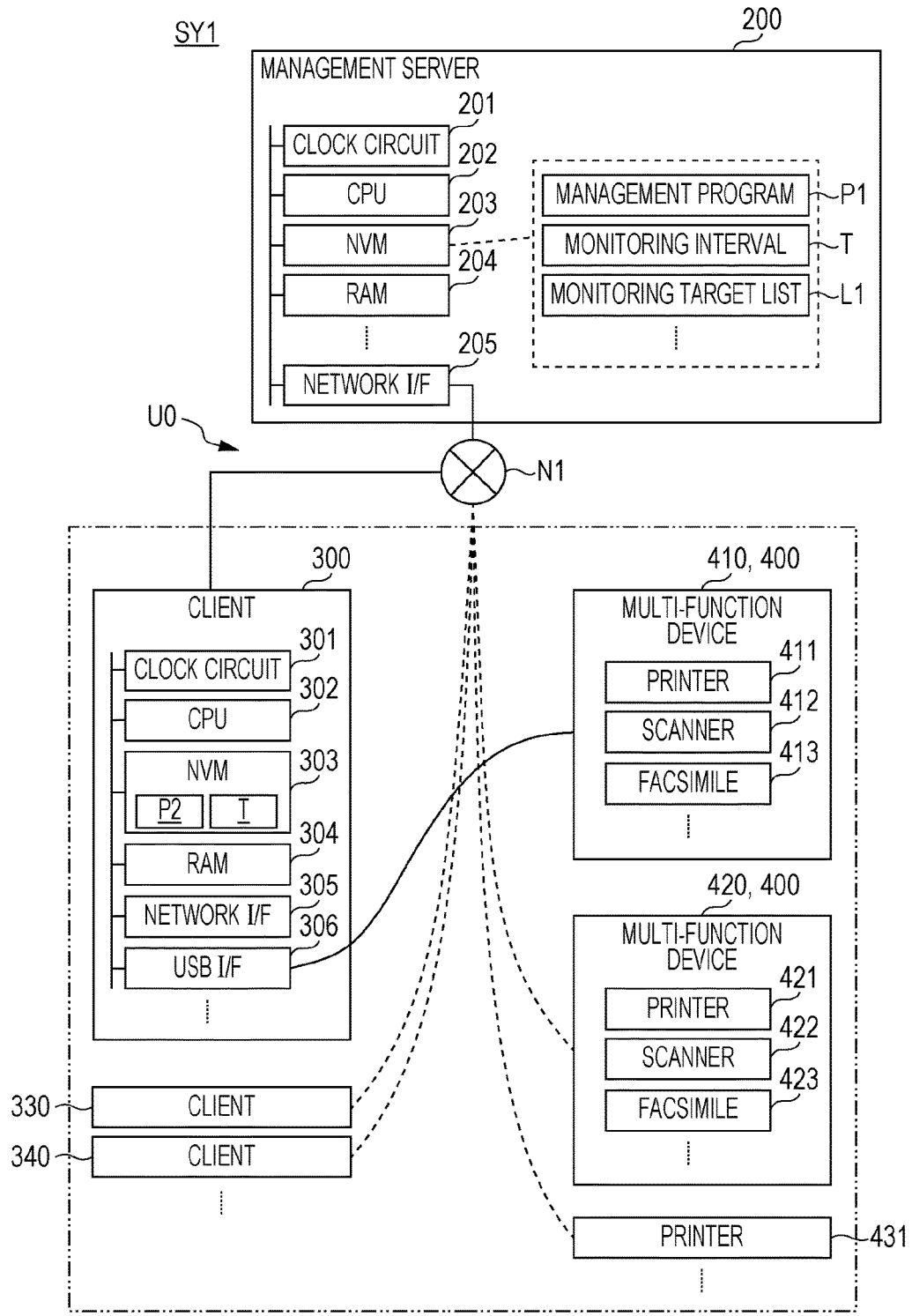
FIG. 1 is a block diagram schematically illustrating an example of a management system including a monitoring apparatus.

Embodiments of the invention will be described below. The following embodiments are mere examples of the invention, and not all features shown in the embodiments are necessarily needed to solve the above-mentioned issue.

(1) OUTLINE OF TECHNIQUE INCLUDED IN INVENTION

First, with reference to examples shown in FIGS. 1 to 17, an outline of a technique included in the invention will be described. Note that the drawings of the present application schematically show examples, and thus, the dimensions in the drawings are not consistent in some cases. Elements of the present technique are not limited to specific examples denoted by reference symbols.

First Aspect

A monitoring apparatus U0 according to one aspect of the present technique includes a status information acquisition unit U1 and a monitoring interval setting unit U3 and acquires, at a monitoring timing tw (exemplarily shown in FIG. 10), device information 620 which is a target of collection from a device (for example, a multi-function apparatus 400). The status information acquisition unit U1 acquires from the device (400), status information 610 that includes information representing a power supply state of the device (400). The monitoring interval setting unit U3 sets a monitoring interval T, which is an interval of the monitoring timing tw, in accordance with the power supply state denoted by the status information 610 which has been acquired.

In the first aspect, the monitoring interval T is set in accordance with the power supply state of the device (400), and therefore, it is possible to provide a monitoring apparatus which enables a reduction in power consumption by the device.

Here, examples of the device include printing apparatuses, image reading apparatuses, facsimiles, copiers, storage devices, and multi-function devices having functions thereof.

Examples of the device information include information representing the amount of remaining consumables and information representing the period of use of the consumables. Examples of acquisition of the device information from the device include direct acquisition of the device information from the device and acquisition of the device information from the device via an intermediate element. Examples of acquisition of the status information from the device include direct acquisition of the status information from the device and acquisition of the status information from the device via an intermediate element.

Examples of setting the monitoring interval in accordance with the power supply state include changing the monitoring interval in the case of sleep mode, changing the monitoring interval in the case of a normal mode which is not sleep mode, and changing the monitoring interval both in sleep mode and in the normal mode.

Second Aspect

Figure 12:
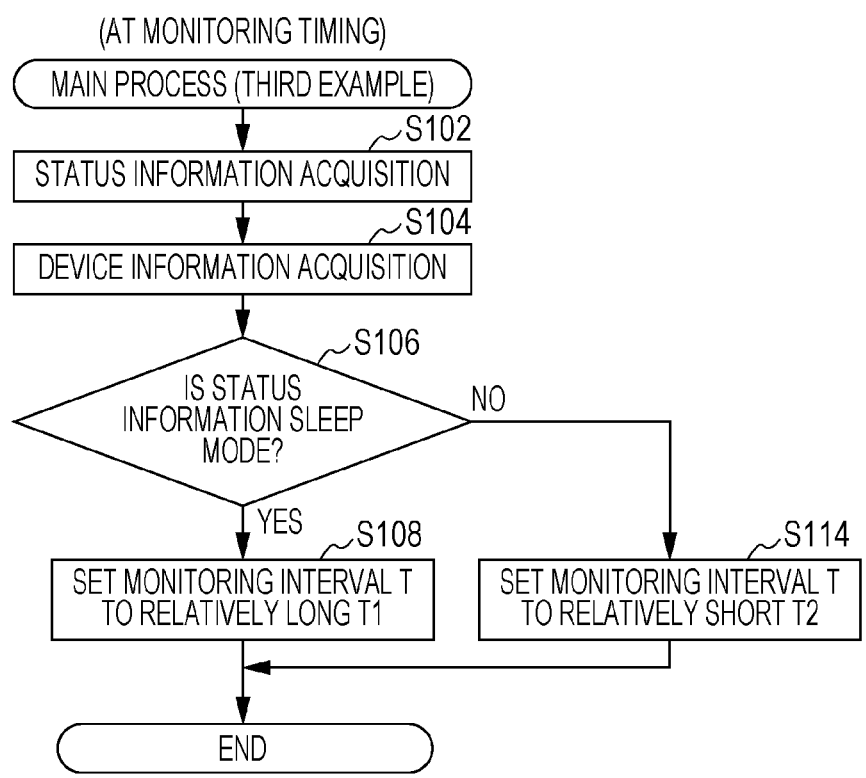
FIG. 12 is a flowchart illustrating a third example of the main process performed at the monitoring timing.

As illustrated in, for example, FIGS. 1 and 12, the monitoring interval T may include a first interval T1 and a second interval T2 shorter than the first interval T1. The monitoring interval setting unit U3 may set the monitoring interval T to the first interval T1 when the power supply state denoted by the status information 610 which has been acquired corresponds to sleep mode. Thus, it is possible to make the monitoring interval T in the case of the device (400) being in sleep mode longer than the monitoring interval T in the case of the device (400) not being in sleep mode. Thus, according to the present aspect, it is possible to provide a preferred example enabling a reduction in power consumption by a device.

Third Aspect

As illustrated in, for example, FIG. 12, the monitoring interval setting unit U3 may set the monitoring interval T to the second interval T2 when the power supply state denoted by the status information 610 which has been acquired does not correspond to sleep mode. Thus, it is possible to make the monitoring interval T in the case of the device (400) not being in sleep mode shorter than the monitoring interval T in the case of the device (400) being in sleep mode. Thus, according to the present aspect, it is possible to provide a preferred example enabling a reduction in power consumption by a device.

Fourth Aspect

Figure 7:
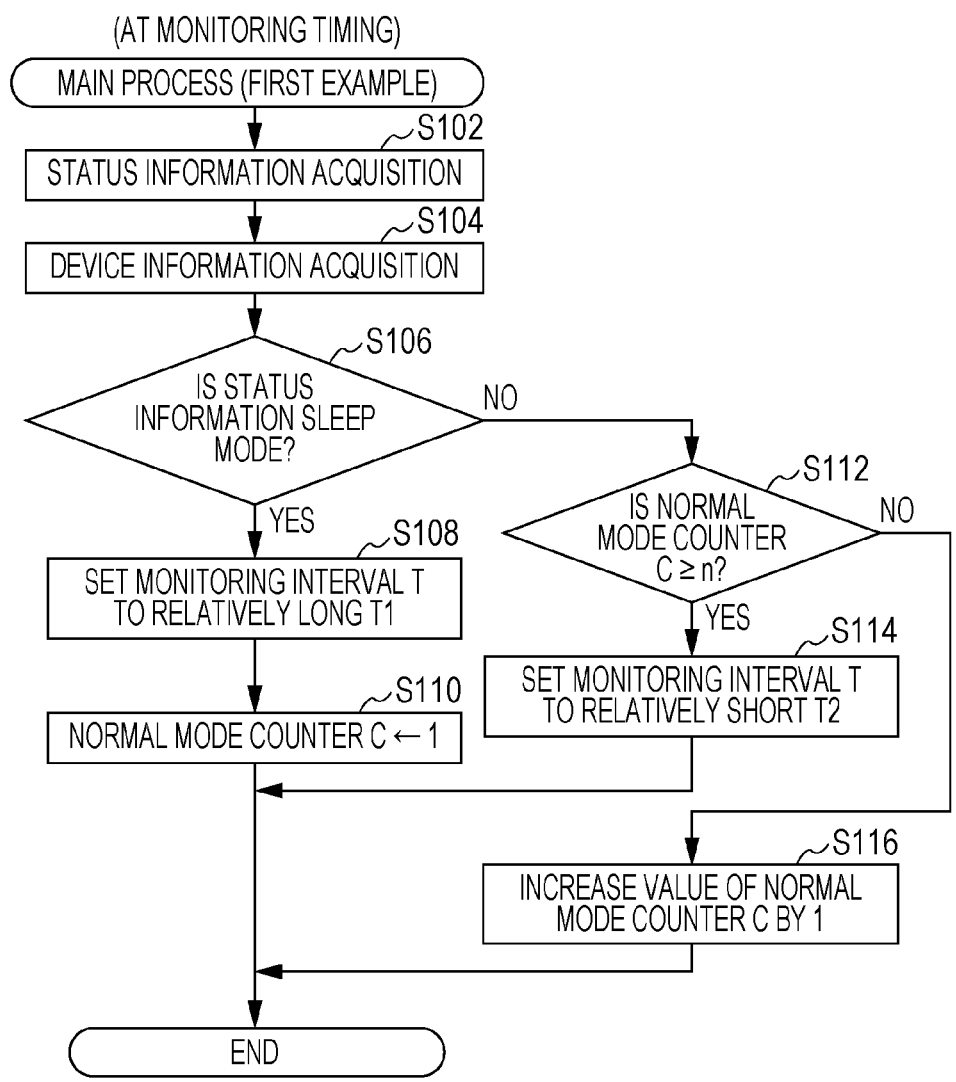
FIG. 7 is a flowchart illustrating a first example of a main process performed at a monitoring timing.
Figure 11:
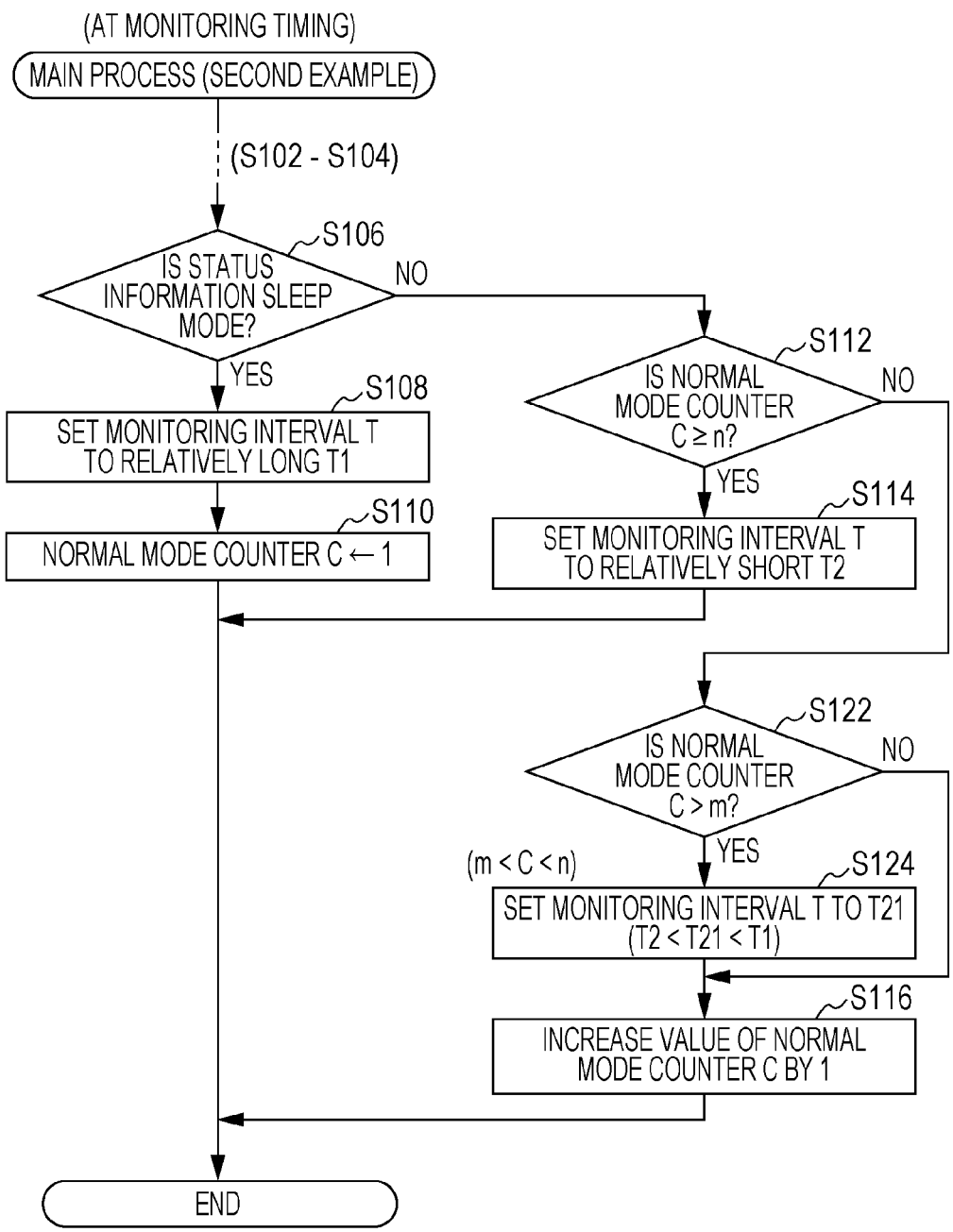
FIG. 11 is a flowchart illustrating a second example of the main process performed at the monitoring timing.

Moreover, as illustrated in, for example, FIGS. 7 and 11, the monitoring interval setting unit U3 may set the monitoring interval T to the second interval T2 when the number of consecutive times that the power supply state denoted by the status information 610 which has been acquired does not correspond to sleep mode is larger than or equal to n (threshold value n is an integer greater than or equal to 2). Thus, when the device (400) operates frequently, such as when the device (400) is not in sleep mode for n consecutive times, that is, when frequent acquisition of the device information 620 is necessary, the monitoring interval T is the second interval T2, which is a shorter interval. Thus, according to the present aspect, it is possible to provide a preferred example enabling a reduction in power consumption by a device.

Fifth Aspect

Figure 13:
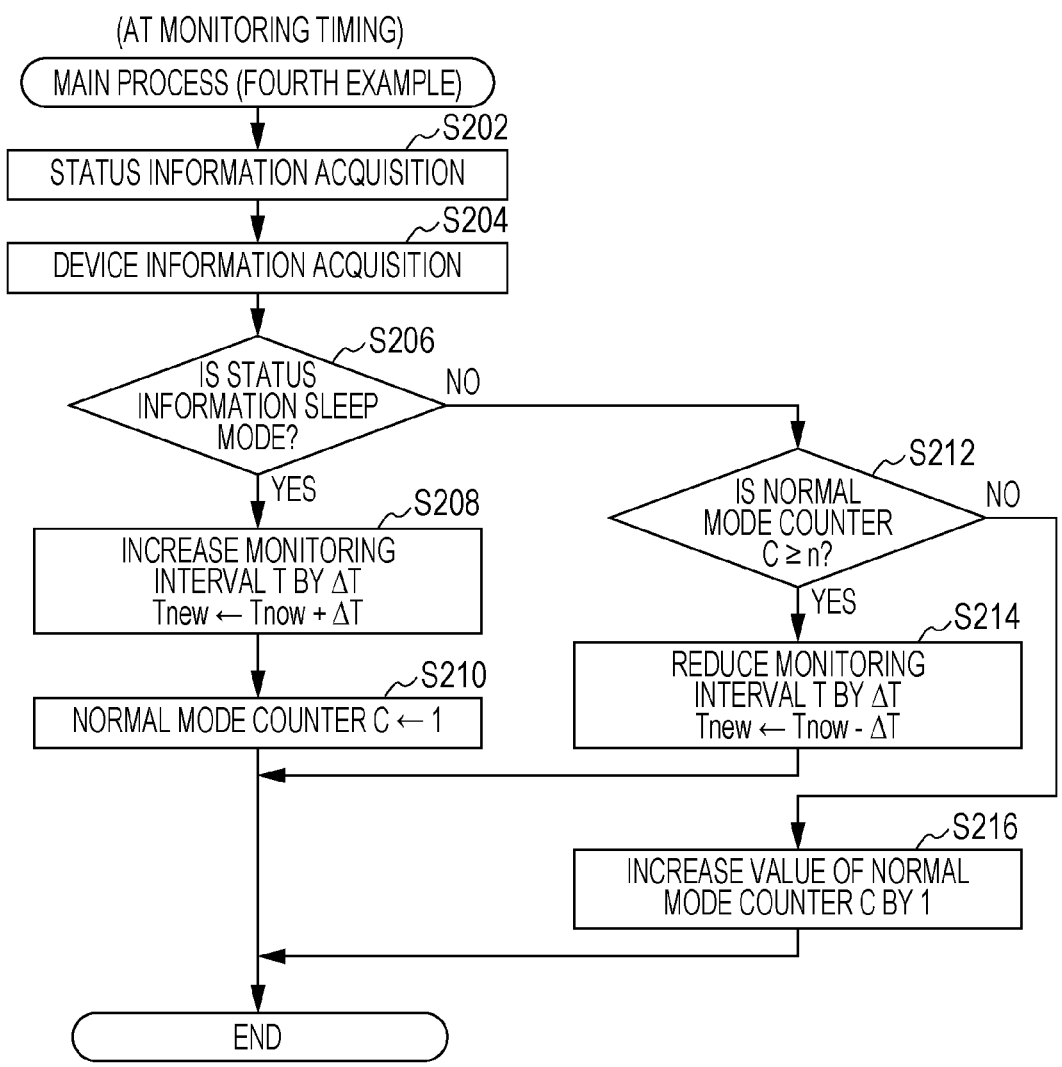
FIG. 13 is a flowchart illustrating a fourth example of the main process preformed at the monitoring timing.
Figure 15:
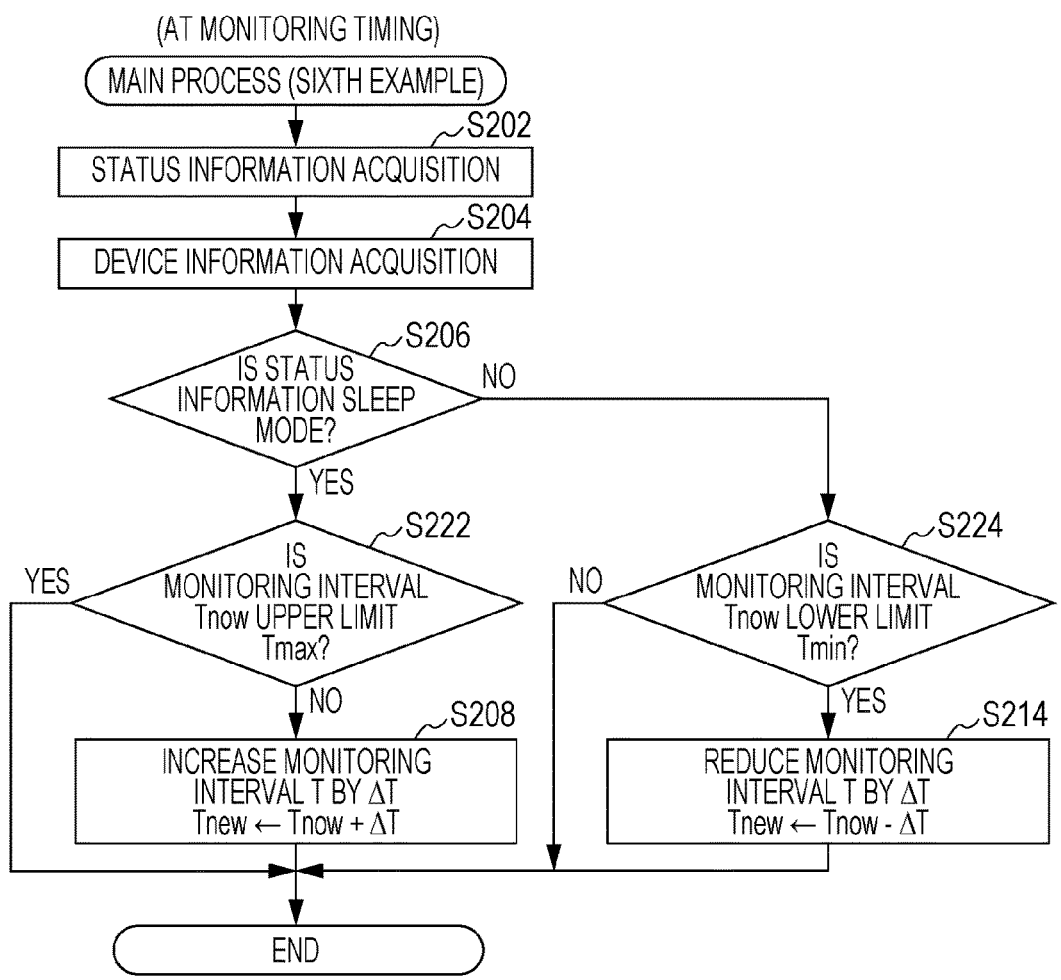
FIG. 15 is a flowchart illustrating a sixth example of the main process performed at the monitoring timing.

Here, as illustrated in, for example, FIGS. 13 and 15, the monitoring interval setting unit U3 may make a setting (for example, a monitoring interval Tnew) of the monitoring interval T longer than a current setting (for example, a monitoring interval Tnow) when the power supply state denoted by the status information 610 which has been acquired correspond to sleep mode. Thus, the monitoring interval T in the case of the device (400) being in sleep mode increases. Thus, according to the present aspect, it is possible to provide a preferred example enabling a reduction in power consumption by a device.

Sixth Aspect

Figure 14:
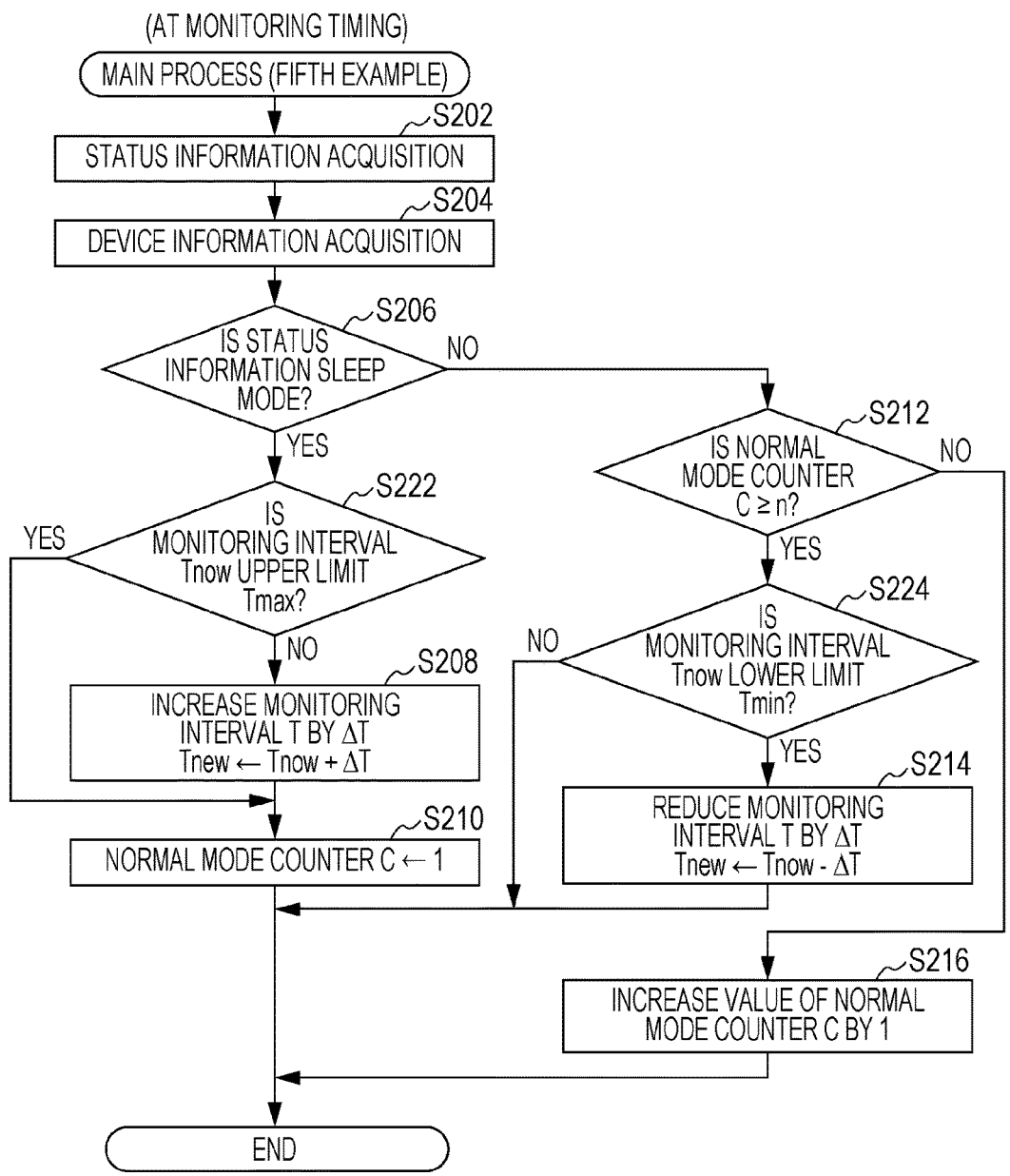
FIG. 14 is a flowchart illustrating a fifth example of the main process performed at the monitoring timing.

As illustrated in, for example, FIG. 14, the monitoring interval setting unit U3 does not have to make the setting of the monitoring interval T longer than the current setting (for example, the monitoring interval Tnow) when the setting (for example, the monitoring interval Tnew) of the monitoring interval T reaches an upper limit Tmax. According to this aspect, it is possible to avoid an extremely long monitoring interval when the device (400) remains in sleep mode.

Seventh Aspect

As illustrated in FIG. 15, the monitoring interval setting unit U3 may make a setting (for example, a monitoring interval Tnew) of the monitoring interval T shorter than a current setting (for example, a monitoring interval Tnow) when the power supply state denoted by the status information 610 which has been acquired does not correspond to sleep mode. Thus, the monitoring interval T in the case of the device (400) not being in sleep mode decreases. Thus, according to the present aspect, it is possible to provide a preferred example enabling a reduction in power consumption by a device.

Eighth Aspect

Moreover, as illustrated in FIG. 14, the monitoring interval setting unit U3 may make a setting (for example, a monitoring interval Tnew) of the monitoring interval T shorter than a current setting (for example, a monitoring interval Tnow) when the number of consecutive times that the power supply state denoted by the status information 610 which has been acquired does not correspond to sleep mode is larger than or equal to n (threshold value n is an integer greater than or equal to 2). Thus, when the device (400) operates frequently, such as when the device (400) is not in sleep mode for n consecutive times, that is, when frequent acquisition of the device information 620 is necessary, the monitoring interval T decreases. Thus, according to the present aspect, it is possible to provide a preferred example enabling a reduction in power consumption by a device.

Ninth Aspect

As illustrated in, for example, FIG. 14, the monitoring interval setting unit U3 does not have to make the setting of the monitoring interval T shorter than the current setting (for example, the monitoring interval Tnow) when the setting (for example, the monitoring interval Tnew) of the monitoring interval T reaches a lower limit Tmin. According to this aspect, it is possible to avoid an extremely short monitoring interval T when a state where the device (400) does not remain in sleep mode.

Tenth Aspect

As illustrated in FIG. 11, when the threshold value n is an integer greater than or equal to 3, the monitoring interval setting unit U3 may set the monitoring interval T of the case where the number of consecutive times that the power supply state denoted by the status information 610 which has been acquired does not correspond to sleep mode is smaller than or equal to m (threshold value m is an integer greater than or equal to 1 and less than (n−1)) longer than the monitoring interval T of the case where the number of consecutive times that the power supply state denoted by the status information 610 which has been acquired does not correspond to sleep mode is larger than m and smaller than n. Thus, when the device (400) operates frequently, such as when the device (400) is not in sleep mode for (m+1) consecutive times, the monitoring interval T decreases. Thus, according to the present aspect, it is possible to provide a preferred example enabling a reduction in power consumption by a device.

Eleventh Aspect

As illustrated in FIGS. 16 and 17, sleep mode of the device may have a plurality of stages. When the power supply state denoted by the status information 610 which has been acquired corresponds to sleep mode, the monitoring interval setting unit U3 may set the monitoring interval T in accordance with the stages of sleep mode. In this aspect, the monitoring interval T is set in accordance with the stages of sleep mode of the device (400), and therefore, it is possible to provide a preferred example which enables a reduction in power consumption by the device in the case where sleep mode has the plurality of stages.

Twelfth Aspect

Figure 10:
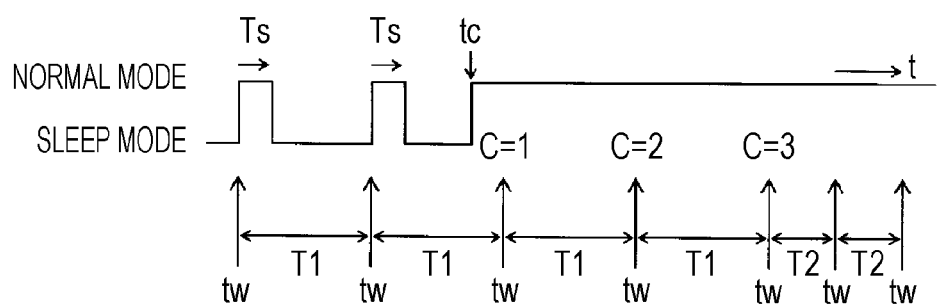
FIG. 10 is a view schematically illustrating an example of a change in monitoring interval.

As illustrated in FIG. 10, the monitoring interval T of the case where the power supply state denoted by the status information 610 which has been acquired corresponds to sleep mode may be longer than a period Ts from termination of a prescribed operation of the device (400) to transition of the device (400) to sleep mode. With this aspect, it is possible to avoid continuation of a state where frequent acquisition of device information from a device causes continuation of a state where the device is not in sleep mode.

Here, examples of the prescribed operation whose termination is a starting point of the period for transition to sleep mode include device information transmission, printing, image reading, facsimile transmission, and facsimile reception.

Thirteenth Aspect

As illustrated in, for example, FIG. 1, the device may be a printing apparatus. According to this aspect, it is possible to provide a monitoring apparatus enabling a reduction in power consumption by the printing apparatus.

Here, examples of the printing apparatus include single-function printers, facsimiles, copiers, and multi-function apparatus having a print function. The printing apparatus may be a stationary apparatus or a portable apparatus.

Fourteenth Aspect

Here, a monitoring method according to one aspect of the present technique includes a status information acquisition step ST1 corresponding to the status information acquisition unit U1 and a monitoring interval setting step ST3 corresponding to the monitoring interval setting unit U3. With this aspect, it is possible to provide a monitoring method enabling a reduction in power consumption by the device.

Fifteenth Aspect

Moreover, a monitoring program according to one aspect of the present technique causes a computer to realize a status information acquisition function FU1 corresponding to the status information acquisition unit U1 and a monitoring interval setting function FU3 corresponding to the monitoring interval setting unit U3. With this aspect, it is possible to provide a program enabling a reduction in power consumption by the device.

Moreover, the present technique is applicable, for example, to a management system including a monitoring apparatus, a method for controlling the monitoring apparatus, a method for controlling the management system, a control program of the monitoring apparatus, a control program of the management system, and a computer readable medium storing the monitoring program and/or the control program. The monitoring apparatus and/or the management system may include a plurality of dispersed components.

(2) SPECIFIC EXAMPLE OF MONITORING APPARATUS

FIG. 1 schematically shows a management system SY1 including the monitoring apparatus U0. The management system SY1 includes a management server 200 as a server computer, clients 300, 330, 340, . . . as client computers, multi-function devices 410 and 420 which are examples of the multi-function apparatus 400, a printer 431 which is a single-function device, and the like. Note that the multi-function apparatus 400 and the printer 431 are examples of the printing apparatus. An installation area of the clients 300, 330, 340, . . . , the multi-function apparatus 400, and the printer 431 is expected to be a relatively small area, such as a business establishment, a branch, or the like but may be distributed areas. The installation site of the management server 200 is expected to be a site, such as a site outside the business establishment or a site outside the branch, relatively remote from the clients and the like but may be included in an area where the clients and the like are installed.

In FIG. 1, the management server 200, the clients 300, 330, 340, . . . , the multi-function device 420, and the printer 431 are connected to a network N1 to be able to input and output information to and from each other. As the network N1, the Internet, a Local Area Network (LAN), and a network connecting LANs via a Wide Area Network (WAN), or the like may be used, and examples of the network N1 may include a wireless network such as a wireless LAN. The client 300 and the multi-function device 410 are connected to each other via a USB interface to be able to input and output information to and from each other. The USB interface is an example of a universal serial interface, and USB-compatible apparatuses can be connected to each other via a USB cable, but the cable connection may be replaced with a wireless connection. Due to the specification of the USB, the client 300 and the multi-function device 410 are installed in sites relatively close to each other. Note that the number of clients included in the management system is not particularly limited and may be one. The number of multi-function devices included in the management system is not particularly limited and may be one. The number of single-function devices included in the management system may be two or more, or the management system does not have to include the single-function device. The management server 200 may include a plurality of distributed computers.

The management server 200 shown in FIG. 1 includes a clock circuit 201, a Central Processing Unit (CPU) 202, Non-Volatile Memory 203, Random Access Memory (RAM) 204, a network interface (I/F) 205, a display device which is not shown, an input apparatus (for example, a pointing device or a keyboard) which is not shown, and the like. These components 201 to 205 and the like are connected to each other to be able to input and output data to and from each other. The nonvolatile memory 203 stores a management program P1 which is to be developed in the RAM 204, a monitoring interval T which is the interval of the monitoring timing tw (see FIG. 10), a monitoring target list L1 representing a list of registered devices connected to the management system SY1, and the like. As the nonvolatile memory 203, Read Only Memory (ROM), nonvolatile semiconductor memory such as flash memory, a magnetic recording medium such as a hard disk, or the like may be used. The network I/F 205 is connected to the network N1 and performs a process of transmitting and receiving data to and from external devices (for example, the clients 300, 330, 340, . . . , the multi-function device 420, and the printer 431) connected to the network N1.

Note that the management server 200 may include a plurality of devices which are separated from each other but can communicate with each other.

The client 300 shown in FIG. 1 includes a clock circuit 301, a CPU 302, nonvolatile memory 303, RAM 304, a network I/F 305, a USB I/F 306, a display device which is not shown, and an input apparatus which is not shown, and the like. These components 301 to 306 and the like are connected to each other to be able to input and output data to and from each other. The nonvolatile memory 303 stores a management program P2 which is to be developed in the RAM 304, the monitoring interval T, and the like. The management programs P1 and P2 are examples of the monitoring program. As the nonvolatile memory 303, ROM, nonvolatile semiconductor memory, a magnetic recording medium, or the like may be used. The network I/F 305 is connected to the network N1 and performs a process of transmitting and receiving data to and from the external devices connected to the network N1. The USB I/F 306 is connected to the multi-function device 410 and performs a process of transmitting and receiving data to and from the multi-function device 410.

Note that the client 300 may include a plurality of devices which are separated from each other but can communicate with each other. Moreover, the configurations of the clients 330, 340, . . . are the same as the configuration of the client 300, and the description thereof is thus omitted.

The multi-function device 410 shown in FIG. 1 includes a printer 411, a scanner 412, a facsimile 413, and the like and is connected to the client 300 via a USB interface. The multi-function device 420 shown in FIG. 1 includes a printer 421, a scanner 422, a facsimile 423, and the like and is connected to the network N1. To this network N1, the printer 431 is also connected. The printer 431 may be a stationary printing apparatus or a portable printing apparatus.

The printers 411, 421, 431, . . . are apparatuses configured to perform printing on a print substrate such as a copy paper sheet. The printers 411, 421, 431, . . . form images corresponding, for example, to image data on the print substrate with ink (which is an example of a coloring material). The printers 411, 421, 431, . . . of the present specific example are ink jet printers, but an electro-photographic system printer such as a laser printer may be used as the printers 411, 421, 431, . . . . Thus, a coloring material which is fixed to the print substrate may be toner or the like.

The scanners 412 and 422 are image reading apparatuses configured to read document images. The scanners 412 and 422 read document images, for example, by irradiating document with light from a light source to form corresponding image data. As the scanners 412 and 422, flatbed scanners in which a document is placed between a platen glass and a document cover, scanners with document feeders, or the like may be used.

The facsimiles 413 and 423 are connected to telephone lines which are not shown, and communicate with another facsimile connected to the telephone lines.

Figure 2:
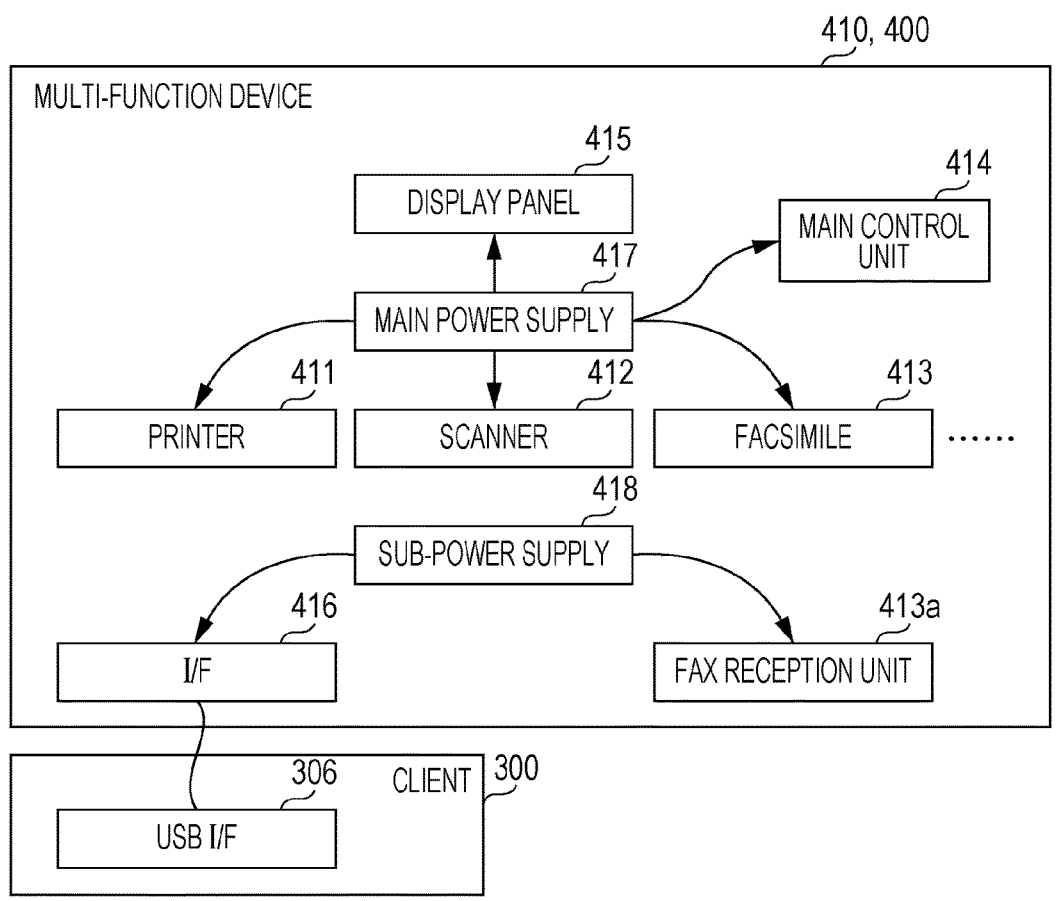
FIG. 2 is a block diagram schematically illustrating an example of supplying of power in a device.

FIG. 2 schematically shows an example of supplying of power in the multi-function device 410. The multi-function device 410 includes a main power supply 417 and an auxiliary power supply 418. The main power supply 417 supplies electric power to, for example, a main control unit 414, a display panel 415, the printer 411, the scanner 412, and a main part of the facsimile 413. The main control unit 415 controls operation of the entire multi-function device 410 by using electric power from the main power supply 417. The display panel 415 displays the state of the multi-function device 410 by using electric power from the main power supply 417. Moreover, the auxiliary power supply 418 supplies electric power to, for example, an I/F 416, a FAX reception unit 413a included in the facsimile 413, and the like. The I/F 416 transmits and receives data to and from external devices by using electric power from the auxiliary power supply 418. For example, when the I/F 416 conforms to a USB standard, the I/F 416 is connected to the USB I/F 306 of the client 300 via a connection means such as a USB cable. Although not shown, when the I/F 416 is a network I/F, the I/F 416 is connected to the network N1 and performs a process of transmitting and receiving data to and from the external devices connected to the network N1. The FAX reception unit 413a is capable of receiving communication from another facsimile at all times by using electric power from the auxiliary power supply 418.

Figure 3:
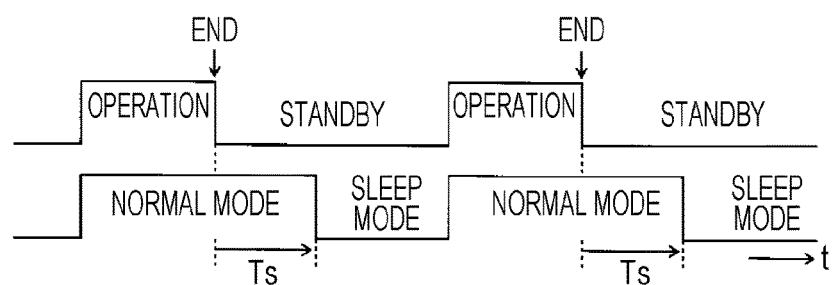
FIG. 3 is a timing chart schematically illustrating an example of a sleep transition period of the device.

FIG. 3 schematically shows a sleep transition period Ts of the multi-function apparatus 400. The sleep transition period Ts (Ts>0) from termination of the prescribed operation to transitions to sleep mode in order to save electric power is set by the multi-function apparatus 400. In FIG. 3, the abscissa represents time t, the upper timing chart shows whether the multi-function apparatus 400 is in operation or on standby (is not in operation), and the lower timing chart shows whether the power supply state of the multi-function apparatus 400 is in sleep mode or in a normal mode (is not in sleep mode). The term "in the operation" means, for example, that the device information 620 is being transmitted, that printing is being performed in the case of the printer, or that scanning is being performed in the case of the scanner. As illustrated in FIG. 3, the power supply state transitions from the normal mode to sleep mode after the sleep transition period Ts has elapsed since the termination of the prescribed operation. Note that when the prescribed operation is started, the power supply state transitions from sleep mode to the normal mode. When, a next operation is started within the sleep transition period Ts after termination of an operation, the normal mode continues.

Figure 4:
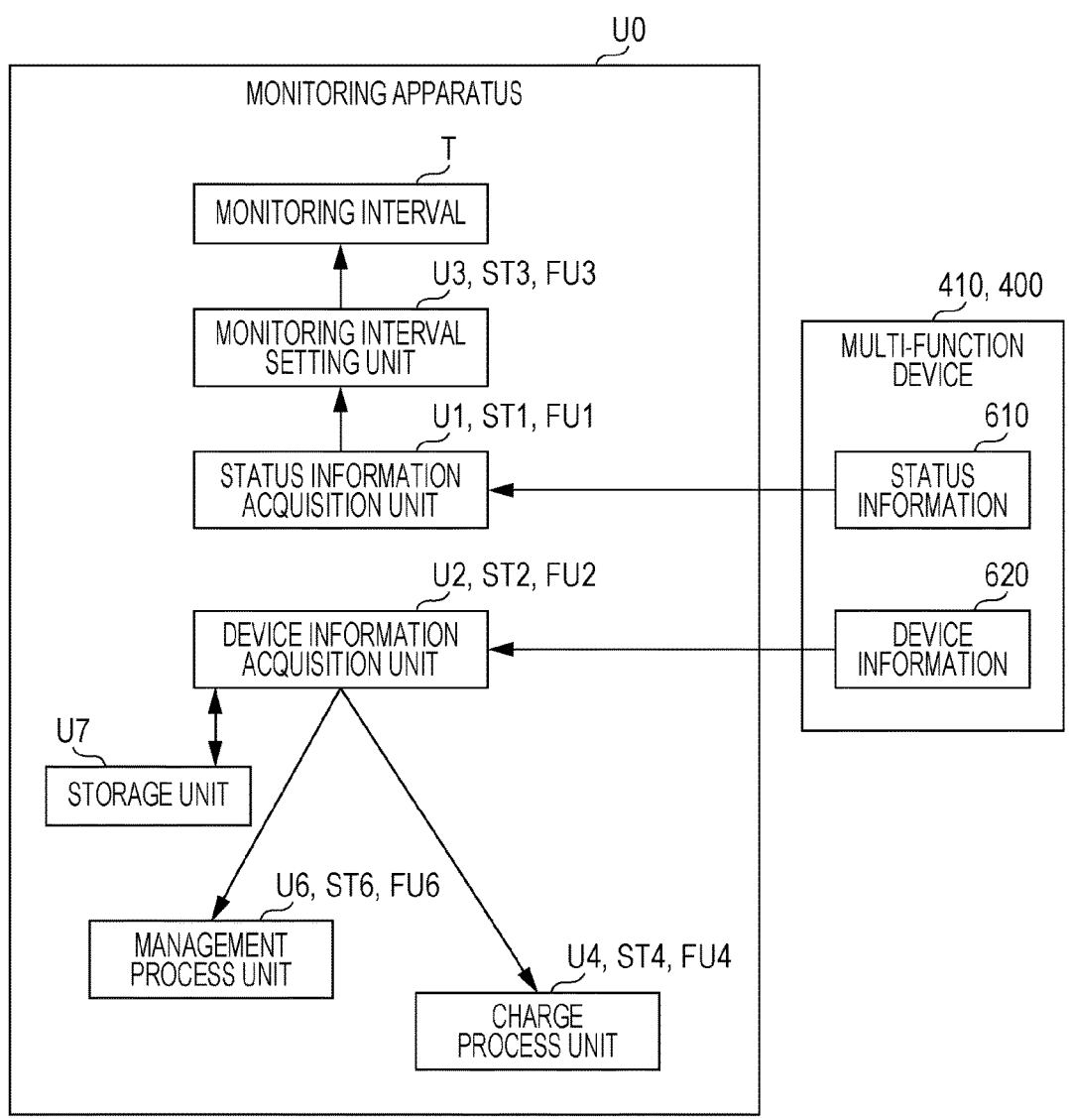
FIG. 4 is a block diagram schematically illustrating an example of the monitoring apparatus.

FIG. 4 schematically shows the monitoring apparatus U0. The monitoring apparatus U0 of the present specific example includes the management server 200 configured to run the management program P1 and the client 300 configured to run the management program P2. The monitoring apparatus U0 shown in FIG. 4 includes the status information acquisition unit U1, a device information acquisition unit U2, the monitoring interval setting unit U3, a charge process unit U4, a management process unit U6, and a storage unit U7. The monitoring method performed by the monitoring apparatus U0 includes the status information acquisition step ST1, a device information acquisition step ST2, the monitoring interval setting step ST3, a charge process step ST4, and a management process step ST6. The management programs P1 and P2 cause a computer to realize the status information acquisition function FU1, a device information acquisition function FU2, the monitoring interval setting function FU3, a charge process function FU4, and a management process function FU6.

First, components of the monitoring apparatus U0 are briefly described. A device as a target from which the device information 620 is to be acquired is the multi-function device 410.

At the monitoring timing tw, the status information acquisition unit U1 acquires from the multi-function device 410, the status information 610 which includes information representing a power supply state of the multi-function device 410. The status information 610 illustrated in FIG. 5 includes statuses representing whether the power supply state to the printer 411 corresponds to the normal mode (a state which is not a power-saving mode) or sleep mode (power-saving mode), whether the printer 411 is performing printing or in an idle mode (is not performing printing), whether the firmware of the printer 411 is being updated or on standby (in a state in which the firmware is not being updated), and the like. When multi-function device 410 receives a request for the status information 610 in sleep mode, some devices transmit the status information 610 while remaining in sleep mode whereas some devices transition from sleep mode to the normal mode and then transmit the status information 610.

The device information acquisition unit U2 acquires the device information 620 which is a target of collection from the multi-function device 410 at the monitoring timing tw. The device information 620 illustrated in FIG. 6 includes the amount of remaining consumables such as the amount of remaining ink, a period of use of the consumables such as a period of use of a roller, for example, a sheet feeder, the model number of the consumables such as the model number of the ink, information for charge amount calculation such as the number of print sheets, and the like. Among such pieces of information, the amount of remaining consumables, the period of use of the consumables, and the number of print sheets are pieces of information which change depending on operation of the multi-function device 410. The model number of the consumables is information which does not change depending on the operation of the multi-function device 410. The device information acquisition unit U2 stores the acquired device information 620 in the storage unit U7 (for example, the nonvolatile memory 203 and 303). When the multi-function device 410 receives the request for the device information 620 in sleep mode, the multi-function device 410 transitions from the sleep mode to the normal mode and then transmits the device information 620.

The monitoring interval setting unit U3 sets the monitoring interval T such that the power consumption of the multi-function device 410 is reduced in accordance with the power supply state denoted by the status information 610 acquired at the monitoring timing tw, and the monitoring interval setting unit U3 stores the monitoring interval T in the storage unit U7 (for example, nonvolatile memory 203 and 303).

The charge process unit U4 acquires from a device, the device information 620 for collecting charge information at a charge information collection timing for collecting the charge information regarding use of the multi-function device 410, and performs a process of billing the charge amount.

The management process unit U6 performs a monitoring process and the like.

(3) FIRST EXAMPLE OF PROCESS PERFORMED BY MONITORING APPARATUS

Next, an example of the process performed by the monitoring apparatus U0 will be described. Note that the management server 200 and the client 300 concurrently perform a plurality of processes by multitasking. The processes, for example, the processes shown in FIGS. 7 to 9, 11 to 15, and 17 for realizing the present technique are not necessarily performed by the CPU but may be performed by an electronic component [e.g., an Application Specific Integrated Circuit (ASIC)]. Moreover, the processes for realizing the present technique may be performed by a plurality of CPUs in a distributed manner or may be performed by cooperation of the CPU and an electronic component (for example, an ASIC).

FIG. 7 shows a main process performed by the monitoring apparatus U0 at the monitoring timing tw. This process is performed by the client 300 alone connected via a USB to the multi-function device 410 registered in the monitoring target list L1. The main process may be performed by cooperation of the management server 200 and the client 300, or when the device is connected to the network N1, the main process may be performed by the management server 200 alone. Here, the step S102 corresponds to the status information acquisition unit U1, the status information acquisition function FU1, and the status information acquisition step ST1. The step S104 corresponds to the device information acquisition unit U2, the device information acquisition function FU2, and the device information acquisition step ST2. The steps S106 to S116 correspond to the monitoring interval setting unit U3, the monitoring interval setting function FU3, and the monitoring interval setting step ST3. The term "step" is hereinafter omitted.

The setting of the monitoring interval T shown in FIG. 7 include two stages, i.e., a relatively long first interval T1 and a relatively short second interval T2 (T2<T1). Here, the intervals T1 and T2 are each longer than the sleep transition period Ts as illustrated in FIG. 10.

When the main process is started at the monitoring timing tw, the client 300 acquires the status information 610 from the control unit of the multi-function device 410 (S102) and further acquires the device information 620 (S104). The status information 610 is acquired before the device information 620 because if the device information 620 is acquired before the status information 610, acquisition of the device information 620 directly before the acquisition of the status information 610 switches the multi-function device 410 from sleep mode to the normal mode. Note that if the status information 610 includes information representing that switching from sleep mode to the normal mode has been performed in response to the request for the device information 620, the client 300 may request for and acquire the status information 610 and the device information 620 concurrently. After the acquisition of the device information 620, the monitoring process shown in FIG. 8 is performed.

Figure 8:
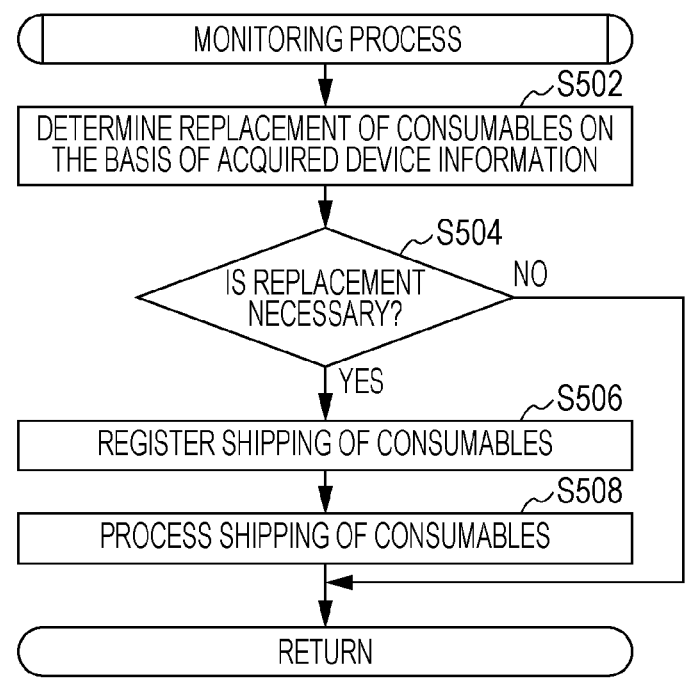
FIG. 8 is a flowchart illustrating an example of a monitoring process.

FIG. 8 shows an example of the monitoring process performed after S104 of FIG. 7. This process is performed by the management server 200 in cooperation with the client 300, and the device information 620 acquired in S104 is transmitted over the network N1 from the client 300 to the management server 200. The monitoring process corresponds to the management process unit U6, the management process function FU6, and the management process step ST6.

When the monitoring process is started, the management server 200 determines, on the basis of the device information 620 acquired in the main process, whether or not the consumables have to be replaced (S502). For example, when the amount of remaining ink represented by the device information 620 is smaller than a prescribed threshold value, it can be determined that replacement is necessary, whereas when the amount of remaining ink is larger than or equal to the threshold value, it can be determined that the replacement is not necessary. Determinations are made in a similar manner as to the amount of remaining consumables other than the ink, the period of use of the consumables, and the like.

Then, the management server 200 determines whether or not there is a consumable for which it has been determined in S502 that replacement is necessary (S504). If there is a consumable for which it has been determined that the replacement is necessary, the management server 200 performs a process of registering shipment of a consumable replacing the consumable for which it has been determined that the replacement is necessary (S506). Then, the management server 200 performs a process of shipping the consumable replacing the consumable for which it has been determined that the replacement is necessary (S508), and terminates the monitoring process. The process of shipping of the consumable may be, for example, a process of transmitting an electronic mail addressed to an electronic mail address of a sales person in charge, the electronic mail including contents instructing the shipping of the consumable. The sales person in charge who reads the contents displayed by a computer which received the electronic mail may bring the consumable to the installation site of the multi-function device 410 and replenish the multi-function device 410 with the consumables.

After the device information 620 is acquired in S104 of FIG. 7, the client 300 determines whether or not the power supply state denoted by the status information 610 acquired in S102 corresponds to sleep mode (S106). If the power supply state corresponds to sleep mode, the client 300 sets the monitoring interval T to the relatively long first interval T1 (S108), sets the normal mode counter C to 1 (S110), and terminates the main process. In this case, after the first interval T1, the main process starts again.

In the determination process in S106, if the power supply state denoted by the status information 610 acquired in S102 corresponds to the normal mode, the client 300 determines whether or not the value of the normal mode counter C is larger than or equal to a threshold value n (n is an integer greater than or equal to 2) (S112). If C≥n, the client 300 sets the monitoring interval T to the relatively short second interval T2 (S114) and terminates the main process. If C<n, the client 300 increases the value of the normal mode counter C by 1 without changing the setting of the monitoring interval T (S116) and terminates the main process. Thus, even when the multi-function device 410 is in the normal mode at the monitoring timing tw, if the number of consecutive times that the result of the determination on the power supply state at each monitoring timing tw has been the normal mode, that is, the value of the normal mode counter C, is less than the threshold value n, the monitoring interval T remains to be the first interval T1. When the value of the normal mode counter C is larger than or equal to the threshold value n, the monitoring interval T is reduced from the first interval T1 to the second interval T2, and after the second interval T2, the main process starts again.

Figure 9:
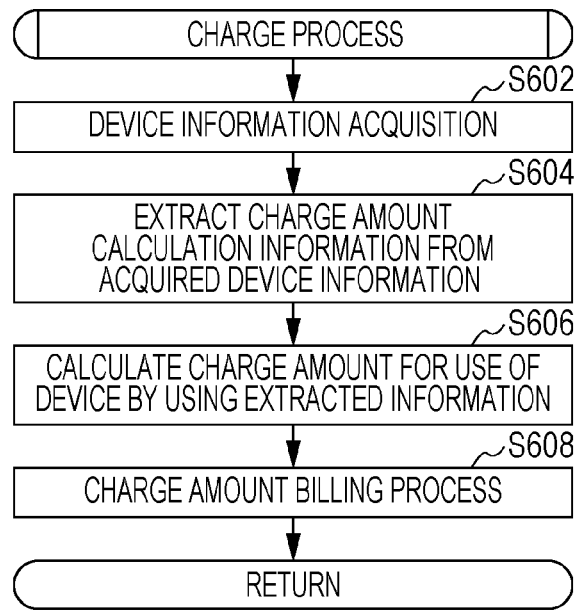
FIG. 9 is a flowchart illustrating an example of a charge process.

The management server 200 performs a charge process shown in FIG. 9 in cooperation with the client 300. This process is performed at the charge information collection timing at which charge information regarding use of the device is collected. For example, when charging is performed at the end of the month, a predetermined time on the last day of every month is the charge information collection timing. In this case, the management server 200 determines whether or not the time of the clock circuit 201 is the charge information collection timing, and if the time is the charge information collection timing, the processes in S602 to S608 may be performed. The charge process corresponds to the charge process unit U4, the charge process function FU4, and the charge process step ST4.

When the charge process is started, the management server 200 acquires the device information 620 via the client 300 from the multi-function device 410 (S602) and extracts information for a charge amount calculation from the device information 620 (S604). For example, when the number of color print sheets (referred to as Nc) and the number of monochrome print sheets (referred to as Nm) per month included in the device information 620 are used in the charge amount calculation, the number of color print sheets Nc and the number of monochrome print sheets Nm may be extracted from the device information 620.

Next, the management server 200 uses the information extracted in S604 to calculate a charge amount of use of a device such as the multi-function device 410 (S606). For example, when a minimal monthly charge is set to Cmin yen, the unit price per color printing is set to Um yen, and the unit price per monochrome printing is set to Um yen, the charge amount of use of the multi-function device 410 may be determined as a calculated value Uc×Nc+Um×Nm in the case where the calculated value Uc×Nc+Um×Nm is larger than or equal to the minimum charge Cmin, whereas the charge amount of use of the multi-function device 410 may be determined as the minimum charge Cmin in the case where the calculated value Uc×Nc+Um×Nm is smaller than the minimum charge Cmin.

The charge amount may be determined according to contracts in various ways. For example, when the number of scan operations (Nscan) per month included in the device information 620 is used in the charge amount calculation, the number of scan operations Nscan may be extracted from the device information 620, and an amount obtained by multiplying the number of scan operations Nscan by the unit price may be taken into consideration to determine the charge amount. Moreover, the charge amount may be determined in consideration of the cost of the consumables. The charge amount may be determined without taking the number of print sheets into consideration.

Then, the management server 200 performs a process of billing the determined charge amount (S608) and terminates the charge process. The process of billing the charge amount may be, for example, a process of transmitting an electronic mail of contents that a bill of the charge amount is issued to an electronic mail address of a user of the device such as the multi-function device 410.

Next, with reference to FIG. 10, the operation and advantages of the main process shown in FIG. 7 will be described. FIG. 10 schematically shows an example of changes of the monitoring interval T by the main process shown in FIG. 7. In FIG. 10, the abscissa represents time t, and the timing chart shows whether the power supply state of the multi-function device 410 corresponds to sleep mode (lower side) or the normal mode (upper side). As illustrated in FIG. 10, until a change timing tc, the multi-function device 410 is in sleep mode except for normal mode transition due to device information transmission, and after the change timing tc, a prescribed operation such as printing continues. The threshold value n of the normal mode counter C is 3. When the main process is performed at a monitoring timing tw while the multi-function device 410 is in sleep mode, the monitoring interval T is set to the relatively long first interval T1. Here, the multi-function device 410 is in the normal mode from the monitoring timing tw during the sleep transition period Ts, but after the sleep transition period Ts, the multi-function device 410 returns to sleep mode. When the main process is performed at a monitoring timing tw after the change timing tc, the normal mode counter C first increases to 1, 2, and then 3 in S116 of FIG. 7 while T=T1. FIG. 10 shows the value of the normal mode counter C at the time of the determination process in S112 of FIG. 7. When C=n=3, the monitoring interval T is set to the relatively short second interval T2.

Thus, the monitoring interval T=T1 in the case of the multi-function device 410 being in sleep mode is longer than the monitoring interval T=T2 in the case of the multi-function device 410 being in the normal mode and the relationship C≥n being satisfied. Therefore, in the case where the multi-function device 410 is in sleep mode, termination of the sleep mode due to acquisition of unnecessarily many pieces of the device information 620 is avoided. Thus, the present specific example enables a reduction in power consumption by the device.

Moreover, when the multi-function device 410 operates frequently, such as when the multi-function device 410 is in the normal mode for n consecutive times, that is, when the device information 620 has to be frequently acquired, the monitoring interval T is set to the second interval T2, which is a shorter interval. Thus, the present specific example enables a preferred reduction in power consumption by the device.

Moreover, since T>Ts, the monitoring timing tw does not fall within a period of transition from sleep mode to the normal mode due to the acquisition of the device information 620. Thus, it is possible to avoid continuation of the normal mode due to repetition of the acquisition of the device information 620 at the monitoring timing tw.

Components in examples described below are substantially the same as those shown in FIGS. 1 to 6, 8, and 9, and basically, only the differences from the first example will be described, wherein the description of components common to the first example is omitted.

(4) SECOND EXAMPLE OF PROCESS PERFORMED BY MONITORING APPARATUS

FIG. 11 shows a second example in which the monitoring interval T is changed during a period during which the multi-function device 410 is in the normal mode and C<n (the threshold value n here is an integer greater than or equal to 3). This process further includes processes S122 and S124 between S112 and S116 of the main process shown in FIG. 7. Note that the processes in S102 to S116 are substantially the same as those of the main process of FIG. 7 and are thus shown in a slightly simplified manner in FIG. 11. Here, S106 to S114, S122, S124, and S116 correspond to the monitoring interval setting unit U3, the monitoring interval setting function FU3, and the monitoring interval setting step ST3.

The second example uses a threshold value m (m is an integer greater than or equal to 1 and less than (n−1)) for comparison with the normal mode counter C. Moreover, setting of the monitoring interval T includes three stages, a relatively long first interval T1, a relatively short second interval T2, and an interval T21 satisfying the following relationship: Ts<T2<T21<T1. The interval T21 and the interval T2 of the second example are examples of the second interval in the second to fourth aspects described above.

When the multi-function device 410 is in the normal mode and C<n, the process performed by the client 300 proceeds to process S122 after the determination process in S112, and the client 300 determines whether or not the value of the normal mode counter C is greater than the threshold value m. If C m, the client 300 increases the value of the normal mode counter C by 1 without changing the setting of the monitoring interval T (S116) and terminates the main process. If m<C<n, the client 300 sets the monitoring interval T to the interval T21 (S124), increases the value of the normal mode counter C by 1 (S116), and terminates the main process. Thus, even when the multi-function device 410 is in the normal mode at the monitoring timing tw, if the number of consecutive times that the result of the determination on the power supply state at each monitoring timing tw has been the normal mode, that is, the value of the normal mode counter C, is smaller than or equal to the threshold value m, the monitoring interval T remains to be the first interval T1. If the value of the normal mode counter C is smaller than the threshold value n and greater than the threshold value m, the monitoring timing T is reduced from the first interval T1 to the interval T21, and after the interval T21, the main process starts again. If the value of the normal mode counter C is larger than or equal to the threshold value n, the monitoring interval T is reduced from the interval T21 to the second interval T2, and after the second interval T2, the main process starts again.

That is, in the normal mode, the monitoring interval T=T21 (T1>T21) in the case where m<C<n, whereas the monitoring interval T=T2 (T21>T2) in the case where n≤C.

As described above, the monitoring interval T=T21 in the case of the multi-function device 410 being in the normal mode and the relationship m<C<n being satisfied is shorter than the monitoring interval T=T1 in the case of the multi-function device 410 being in sleep mode. Thus, when the device 410 operates frequently, such as when the device 410 is in the normal mode for (m+1) consecutive times, the monitoring interval T decreases. Moreover, the monitoring interval T=T2 in the case of the multi-function device 410 being in the normal mode and the relationship n≤C being satisfied is shorter than the monitoring interval T=T21 in the case of the relationship m<C<n being satisfied. Thus, when the device 410 operates frequently, such as when the device 410 is in the normal mode for n consecutive times, the monitoring interval T further decreases. Therefore, the second example enables a preferred reduction in power consumption by the device.

(5) THIRD EXAMPLE OF PROCESS PERFORMED BY MONITORING APPARATUS

FIG. 12 shows a third example of setting the monitoring interval T to a relatively short second interval T2 (T2>Ts) immediately after it is detected that the multi-function device 410 is in the normal mode without using the normal mode counter C. This process does not include the processes in S110, S112, and S116 of the main process shown in FIG. 7.

The same processes as those in the first example are performed until the status information 610 and the device information 620 are acquired at the monitoring timing tw (S102, S104), and whether or not the power supply state denoted by the status information 610 corresponds to sleep mode is determined (S106). If the power supply state corresponds to sleep mode, the client 300 sets the monitoring interval T to a relatively long first interval T1 (S108) and terminates the main process. In this case, after the first interval T1, the main process starts again.

If in the determination process in S106, the power supply state denoted by the status information 610 acquired in S102 corresponds to the normal mode, the client 300 immediately sets the monitoring interval T to a relatively short second interval T2 (S114) and terminates the main process. In this case, after the second interval T2, the main process starts again.

Thus, the monitoring interval T=T1 in the case of the multi-function device 410 being in sleep mode is longer than the monitoring interval T=T2 in the case of the multi-function device 410 being in the normal mode. Therefore, in the case where the multi-function device 410 is in sleep mode, termination of the sleep mode due to acquisition of unnecessarily many pieces of the device information 620 is avoided. Thus, the third specific example also enables a reduction in power consumption by the device.

(6) FOURTH EXAMPLE OF PROCESS PERFORMED BY MONITORING APPARATUS

FIG. 13 shows a fourth example in which the monitoring interval T is finely changed. Here, steps S206 to S216 correspond to the monitoring interval setting unit U3, the monitoring interval setting function FU3, and the monitoring interval setting step ST3.

When the main process is started at the monitoring timing tw, the client 300 acquires the status information 610 from the control unit of the multi-function device 410 (S202) and further acquires the device information 620 (S204). After the acquisition of the device information 620, the monitoring process shown in FIG. 8 is performed.

Then, the client 300 determines whether or not the power supply state denoted by the status information 610 acquired in S202 corresponds to sleep mode (S206). If the power supply state corresponds to sleep mode, the client 300 sets a monitoring interval Tnew=Tnow+ΔT obtained by adding an increment ΔT (ΔT>0) to a current monitoring interval Tnow as the monitoring interval T (S208), sets the value of the normal mode counter C to 1 (S210), and terminates the main process. In this case, after the monitoring interval Tnew=Tnow+ΔT, the main process starts again. The increment ΔT may be a fixed value or may vary in accordance with, for example, the monitoring interval T.

In the determination process in S206, if the power supply state denoted by the status information 610 acquired in S202 corresponds to the normal mode, the client 300 determines whether or not the value of the normal mode counter C is larger than or equal to a threshold value n (n is an integer greater than or equal to 2) (S212). If C≥n, the client 300 sets the monitoring interval Tnew=Tnow−ΔT obtained by subtracting a decrement ΔT (ΔT>0) from the current monitoring interval Tnow as the monitoring interval T (S214) and terminates the main process. If C<n, the client 300 increases the value of the normal mode counter C by 1 without changing the setting of the monitoring interval T (S216) and terminates the main process. Thus, even when the multi-function device 410 is in the normal mode at the monitoring timing tw, if the number of consecutive times that the result of the determination on the power supply state at each monitoring timing tw has been the normal mode, that is, the value of the normal mode counter C, is smaller than the threshold value n, the monitoring interval T remains to be the last interval set in sleep mode. When the value of the normal mode counter C is larger than or equal to the threshold value n, the monitoring interval T is reduced, and after the monitoring interval Tnew=Tnow−ΔT, the main process starts again. The decrement ΔT may be a fixed value or may vary according to, for example, the monitoring interval T. It is particularly preferable when a coefficient a satisfying the relationship 0<a≤0.5 is used so that the decrement ΔT is a×(Tnow−Ts), because the monitoring interval T is not shorter than or equal to the sleep transition period Ts. The value of the decrement ΔT may be different from the value of the increment ΔT.

Thus, if the multi-function device 410 is in the normal mode, the relationship C≥n reduces the monitoring interval T. If the multi-function device 410 is in sleep mode, the monitoring interval T increases. Therefore, in the case where the multi-function device 410 is in sleep mode, termination of the sleep mode due to acquisition of unnecessarily many pieces of the device information 620 is avoided. Thus, the fourth specific example also enables a reduction in power consumption by the device.

(7) FIFTH EXAMPLE OF PROCESS PERFORMED BY MONITORING APPARATUS

FIG. 14 shows a fifth example in which the setting of the monitoring interval T has an upper limit Tmax and a lower limit Tmin (Tmin<Tmax). The lower limit Tmin may be longer than the sleep transition period Ts. This process further includes a process S222 between S206 and S208 and a process S224 between S212 and S214 of the main process shown in FIG. 13. Here, S206, S222, S208, S210, S212, S224, S214, S216 correspond to the monitoring interval setting unit U3, the monitoring interval setting function FU3, and the monitoring interval setting step ST3.

The same processes as those in the fourth example are performed until the status information 610 and the device information 620 are acquired at the monitoring timing tw (S202, S204), and whether or not the power supply state denoted by the status information 610 corresponds to sleep mode is determined (S206). If the power supply state corresponds to sleep mode, the client 300 determines whether or not a monitoring interval Tnow which is a current monitoring interval reaches the upper limit Tmax (S222). If Tnow<Tmax, the client 300 sets a monitoring interval Tnew obtained by adding an increment ΔT to the current monitoring interval Tnow as the monitoring interval T (S208), sets the normal mode counter C to 1 (S210), and terminates the main process. If Tnow≥Tmax, the setting of the monitoring interval T is not made longer than the currently set monitoring interval Tnow, the normal mode counter C is set to 1 (S210), and the main process is terminated. This avoids an extremely long monitoring interval T when the multi-function device 410 remains in sleep mode.

In the determination process in S206, if the power supply state denoted by the status information 610 acquired in S202 corresponds to the normal mode, the client 300 determines whether or not the normal mode counter C is larger than or equal to a threshold value n (n is an integer greater than or equal to 2) (S212). If C≥n, the client 300 determines whether or not the monitoring interval Tnow, which is the current monitoring interval, reaches the lower limit Tmin (S224). If Tnow≥Tmin, the client 300 sets a monitoring interval Tnew obtained by subtracting the decrement ΔT from the current monitoring interval Tnow as the monitoring interval T (S214) and terminates the main process. In this case, after the monitoring interval Tnew=Tnow−ΔT, the main process starts again. If Tnow≤Tmin, the setting of the monitoring interval T is not made shorter than the currently set monitoring interval Tnow, and the main process is terminated. This avoids an extremely short monitoring interval T when the multi-function device 410 remains in the normal mode.

If C<n in the determination process in S212, the client 300 increases the value of the normal mode counter C by 1 without changing the setting of the monitoring interval T (S216) and terminates the main process.

Note that the determination process in S222 may be performed without performing the determination process in S224, or the determination process in S224 may be performed without performing the determination process in S222.

(8) SIXTH EXAMPLE OF PROCESS PERFORMED BY MONITORING APPARATUS

FIG. 15 shows a sixth example in which the normal mode counter C is not used. This process does not include the processes in S210, S212, and S216 of the main process illustrated in FIG. 14.

The same processes as those in the fifth example are performed until the status information 610 and the device information 620 are acquired at the monitoring timing tw (S202, S204), and whether or not the power supply state denoted by the status information 610 corresponds to sleep mode is determined (S106). If the power supply state corresponds to sleep mode, the client 300 determines whether or not a monitoring interval Tnow which is a current monitoring interval reaches the upper limit Tmax (S222), and if Tnow<Tmax, a monitoring interval Tnew obtained by adding an increment ΔT to the current monitoring interval Tnow is set as the monitoring interval T (S208), and the main process is terminated.

In the determination process in S206, if the power supply state denoted by the status information 610 acquired in S202 corresponds to the normal mode, the client 300 determines whether or not the monitoring interval Tnow, which is the current monitoring interval, reaches the lower limit Tmin (S224), and if Tnow>Tmin, the client 300 sets a monitoring interval Tnew obtained by subtracting the decrement ΔT from the current monitoring interval Tnow as the monitoring interval T (S214) and terminates the main process.

Thus, if the multi-function device 410 is in the normal mode, the relationship Tnow≥Tmin reduces the monitoring interval T. If the multi-function device 410 is in sleep mode, the relationship Tnow<Tmax increases the monitoring interval T. Therefore, in the case where the multi-function device 410 is in sleep mode, termination of the sleep mode due to acquisition of unnecessarily many pieces of the device information 620 is avoided. Thus, the sixth specific example also enables a reduction in power consumption by the device.

Note that in the sixth example, even when one or both of the process in S222 and the process in S224 are omitted, the power consumption of the device can be reduced.

(9) SEVENTH EXAMPLE OF PROCESS PERFORMED BY MONITORING APPARATUS

As illustrated in FIGS. 16 and 17, the present technique is also applicable to the case where sleep mode of the device has a plurality of stages. For example, a state where the main power supply 417 and the auxiliary power supply 418 shown in FIG. 2 are ON but supplying of electric power to the display panel 415 is stopped is defined as "light sleep mode", and a state where the auxiliary power supply 418 is ON but the main power supply 417 is OFF is defined as "deep sleep mode". When a period in which the multi-function device 410 is not operating reaches the sleep transition period Ts, the multi-function device 410 transitions to "light sleep mode", and when the "light sleep mode" reaches a prescribed deep sleep transition period, the multi-function device 410 transitions to "deep sleep mode". When a prescribed operation is started while the power supply state corresponds to "light sleep mode" or "deep sleep mode", the power supply state transitions to the normal mode.

FIG. 16 schematically shows a configuration example of a process table TA1 in which monitoring intervals T are set in accordance with a power supply state of the status information 610. In the process table TA1 shown in FIG. 16, the monitoring interval T=T11 is associated with "deep sleep mode", the monitoring interval T=T12 is associated with "light sleep mode", and the monitoring interval T=T2 is associated with the "normal mode". Here, Ts<T2<T12<T11. The interval T11 and the interval T12 of the seventh example are examples of the first interval in the second to fourth aspects described above.

FIG. 17 shows the seventh example in which the monitoring interval T is set in accordance with the stages of sleep mode. In this process, the processes in S106, S108, and S114 of the main process shown in FIG. 12 are replaced with processes in S142 to S148.

When at the monitoring timing tw, the status information 610 and the device information 620 are acquired (S102 and S104), the client 300 branches the process in accordance with the power supply state denoted by the status information 610 acquired in S102 (S142). In S142, a process according to the power supply state may be performed with reference to the process table TA1.

In the determination process in S142, if the power supply state corresponds to "deep sleep mode", the client 300 sets the monitoring interval T to the interval T11 which is relatively long (S144), and the client 300 terminates the main process. In this case, after the interval T11 which is relatively long, the main process starts again. In the determination process in S142, if the power supply state corresponds to "light sleep mode", the client 300 sets the monitoring interval T to the interval T12 satisfying the relationship T11>T12>T2 (S146) and terminates the main process. In this case, after the interval T12, the main process starts again. In the determination process in S142, if the power supply state corresponds to the "normal mode", the client 300 sets the monitoring interval T to the second interval T2 which is relatively short (S148), and the client 300 terminates the main process. In this case, after the second interval T2 which is relatively short, the main process starts again.

Thus, the monitoring interval T=T12 in the case of the multi-function device 410 being in "light sleep mode" is longer than the monitoring interval T=T2 in the case of the multi-function device 410 being in the "normal mode". The monitoring interval T=T11 in the case of the multi-function device 410 being in "deep sleep mode" is longer than the monitoring interval T=T12 in the case of the multi-function device 410 being in "light sleep mode". In this way, in particular, in the case of "deep sleep mode" in which the frequency of use of the multi-function device 410 is low, termination of the "deep sleep mode" due to acquisition of unnecessarily many pieces of device information 620 is avoided. Thus, the seventh example enables a preferred reduction in power consumption by the device when sleep mode includes a plurality of stages.

Note that when sleep mode includes the plurality of stages, it is also possible to increase and decrease the monitoring interval T in accordance with the power supply state. For example, in S144 corresponding to "deep sleep mode", a monitoring interval Tnew=Tnow+$\Delta$T obtained by adding an increment $\Delta$T ($\Delta$T>0) to a current monitoring interval Tnow may be set as the monitoring interval T. The monitoring interval Tnew may have an upper limit Tmax. In S146 corresponding to "light sleep mode", a monitoring interval Tnew=Tnow+b×$\Delta$T obtained by adding b×$\Delta$T (coefficient b is 0<b<1) to the current monitoring interval Tnow may be set as the monitoring interval T. The monitoring interval Tnew may have an upper limit Tmax. In S148 corresponding to the "normal mode", a monitoring interval Tnew=Tnow−$\Delta$T obtained by subtracting a decrement $\Delta$T ($\Delta$T>0) from the current monitoring interval Tnow may be set as the monitoring interval T. The monitoring interval Tnew may have a lower limit Tmin.

FIGS. 16 and 17 show an example of sleep mode having two stages, but also when sleep mode has three or more stages, the monitoring interval T may be set in a similar manner in accordance with the stages of the sleep mode. Moreover, the normal mode counter C is used, and when the number of consecutive times that the power supply state denoted by the status information 610 does not correspond to sleep mode is larger than or equal to n, the monitoring interval T may be set to the second interval T2.

(10) VARIATIONS

Many variations of the invention are possible.

In the above-described examples, the description has been given provided that the multi-function device 410 is the monitoring target device, but the monitoring target device may be the multi-function device 420 connected to the network N1, a single-function device (for example, the printer 431) connected to the monitoring apparatus U0, or the like.

The above-described processes may be accordingly modified, and for example, the order of the processes may be changed. For example, in the main process of, for example, FIG. 7, the process of setting the normal mode counter C to 1 in S110 may be performed before the process in S108.

The example in which the monitoring interval T is changed during a period during which the multi-function device 410 is in the normal mode and C<n is not limited to the second example shown in FIG. 11. For example, the monitoring interval T may be finely set in accordance with the value of the normal mode counter C, for example, the monitoring interval T may be set to {T1−(C/n)×(T1−T2)}. In the above-described example, when n=3 and the multi-function device 410 is in the normal mode, the monitoring interval T decreases to {(⅔)×T1+(⅓)×T2}, {(⅓)×T1+(⅔)×T2}, and then T2 as the normal mode counter C increases to 1, 2, and then 3. The relationship T1>{(⅔)×T1+(⅓)×T2} is satisfied.

Also when T={T1−(C/n)×(T1−T2)}, the monitoring interval T of the case where the number of consecutive times that the power supply state denoted by the status information 610 does not correspond to sleep mode (that is, the value of the normal mode counter C) is smaller than or equal to m (1≤m<n−1) is set longer than the monitoring interval T of the case where the number of consecutive times (C) that the power supply state denoted by the status information 610 does not correspond to sleep mode is larger than m and smaller than n.

The fourth example shown in FIG. 13 and the fifth example shown in FIG. 14 may also be modified such that the monitoring interval T is changed while the multi-function device 410 is in the normal mode and C<n. For example, in S216 of FIGS. 13 and 14, the value of the normal mode counter C may be increased by 1, and a monitoring interval Tnew=Tnow−c×$\Delta$T obtained by subtracting c×$\Delta$T (coefficient c is in the relationship 0<c<1) from the current monitoring interval Tnow may be set as the monitoring interval T. Also in this case, the monitoring interval T of the case where the number of consecutive times that the power supply state denoted by the status information 610 does not correspond to sleep mode (that is, the value of the normal mode counter C) is smaller than or equal to m (1≤m<n−1) is set longer than the monitoring interval T of the case where the number of consecutive times (C) that the power supply state denoted by the status information 610 does not correspond to sleep mode is larger than m and smaller than n.

(11) CONCLUSION

As described above, according to the invention, the various aspects enable providing of a technique and the like enabling a reduction in power consumption by a device. The technique including only components according to independent claim provides the above-described operation and advantages.

Note that the invention also includes a configuration obtained by replacing the configurations disclosed in the above-mentioned examples with each other or changing the combination thereof, a configuration obtained by replacing the configurations disclosed in well-known techniques and the above-mentioned examples with each other or changing the combination thereof, and the like.

The entire disclosure of Japanese Patent Application No. 2016-208388, filed Oct. 25, 2016 is expressly incorporated by reference herein.

What is claimed is:

1. A monitoring apparatus which acquires, at a monitoring timing, device information which is a target of collection from a device, the monitoring apparatus comprising:
a status information acquisition unit configured to acquire from the device, status information that includes information representing a power supply state of the device; and a monitoring interval setting unit configured to set a monitoring interval which is an interval of the monitoring timing in accordance with the power supply state denoted by the status information which has been acquired, wherein the monitoring interval setting unit makes a setting of the monitoring interval longer than a current setting when the power supply state denoted by the status information which has been acquired corresponds to a sleep mode, and wherein the monitoring interval setting unit does not make the setting of the monitoring interval longer than the current setting when the setting of the monitoring interval reaches an upper limit.

2. The monitoring apparatus according to claim 1, wherein the monitoring interval includes a first interval and a second interval shorter than the first interval, and the monitoring interval setting unit sets the monitoring interval to the second interval, when the number of consecutive times that the power supply state denoted by the status information which has been acquired does not correspond to a sleep mode is larger than or equal to n, where n, which is a threshold value, is an integer greater than or equal to 2.

3. The monitoring apparatus according to claim 1, wherein the monitoring interval setting unit makes a setting of the monitoring interval shorter than a current setting when the power supply state denoted by the status information which has been acquired does not correspond to the sleep mode.

4. The monitoring apparatus according to claim 1, wherein a sleep mode of the device has a plurality of stages, and when the power supply state denoted by the status information which has been acquired corresponds to the sleep mode, the monitoring interval setting unit sets the monitoring interval in accordance with the stages of the sleep mode.

5. The monitoring apparatus according to claim 1, wherein the monitoring interval of the case where the power supply state denoted by the status information which has been acquired corresponds to a sleep mode is longer than a period from termination of a prescribed operation of the device to transition of the device to the sleep mode.

6. The monitoring apparatus according to claim 1, wherein the monitoring device is a printing apparatus.

7. A monitoring apparatus which acquires, at a monitoring timing, device information which is a target of collection from a device, the monitoring apparatus comprising:

a status information acquisition unit configured to acquire from the device, status information that includes information representing a power supply state of the device; and a monitoring interval setting unit configured to set a monitoring interval which is an interval of the monitoring timing in accordance with the power supply state denoted by the status information which has been acquired, wherein the monitoring interval setting unit makes a setting of the monitoring interval shorter than a current setting when the number of consecutive times that the power supply state denoted by the status information which has been acquired does not correspond to a sleep mode is larger than or equal to n, where n, which is a threshold value, is an integer greater than or equal to 2.

8. A monitoring apparatus which acquires, at a monitoring timing, device information which is a target of collection from a device, the monitoring apparatus comprising:

a status information acquisition unit configured to acquire from the device, status information that includes information representing a power supply state of the device; and a monitoring interval setting unit configured to set a monitoring interval which is an interval of the monitoring timing in accordance with the power supply state denoted by the status information which has been acquired, wherein the monitoring interval setting unit makes a setting of the monitoring interval shorter than a current setting when the power supply state denoted by the status information which has been acquired does not correspond to a sleep mode, and wherein the monitoring interval setting unit does not make the setting of the monitoring interval shorter than the current setting when the setting of the monitoring interval reaches a lower limit.

9. The monitoring apparatus according to claim 8, wherein a sleep mode of the device has a plurality of stages, and when the power supply state denoted by the status information which has been acquired corresponds to the sleep mode, the monitoring interval setting unit sets the monitoring interval in accordance with the stages of the sleep mode.

10. The monitoring apparatus according to claim 8, wherein the monitoring interval of the case where the power supply state denoted by the status information which has been acquired corresponds to a sleep mode is longer than a period from termination of a prescribed operation of the device to transition of the device to the sleep mode.

11. The monitoring apparatus according to claim 8, wherein the monitoring device is a printing apparatus.

12. A monitoring apparatus which acquires, at a monitoring timing, device information which is a target of collection from a device, the monitoring apparatus comprising:

a status information acquisition unit configured to acquire from the device, status information that includes information representing a power supply state of the device; and a monitoring interval setting unit configured to set a monitoring interval which is an interval of the monitoring timing in accordance with the power supply state denoted by the status information which has been acquired, wherein the monitoring interval includes a first interval and a second interval shorter than the first interval, and the monitoring interval setting unit sets the monitoring interval to the second interval, when the number of consecutive times that the power supply state denoted by the status information which has been acquired does not correspond to a sleep mode is larger than or equal to n, where n, which is a threshold value, is an integer greater than or equal to 2, and wherein when the threshold value n is an integer greater than or equal to 3, the monitoring interval setting unit sets the monitoring interval of the case where the number of consecutive times that the power supply state denoted by the status information which has been acquired does not correspond to the sleep mode is smaller than or equal to m longer than the monitoring interval of the case where the number of consecutive times that the power supply state denoted by the status information which has been acquired does not correspond to the sleep mode is larger than m and smaller than n, where m, which is a threshold value, is an integer greater than or equal to 1 and less than (n−1).

13. A method for acquiring, at a monitoring timing, device information which is a target of collection from a device, the monitoring method comprising:
- acquiring from the device, status information that includes information representing a power supply state of the device; and
- setting a monitoring interval which is an interval of the monitoring timing in accordance with the power supply state denoted by the status information which has been acquired,
- wherein in the setting of the monitoring interval, a setting of the monitoring interval is made longer than a current setting when the power supply state denoted by the status information which has been acquired corresponds to a sleep mode, and
- in the setting of the monitoring interval, the setting of the monitoring interval is not made longer than the current setting when the setting of the monitoring interval reaches an upper limit.

14. The method according to claim 13, wherein
- the monitoring interval includes a first interval and a second interval shorter than the first interval, and
- in the setting of the monitoring interval, the monitoring interval is set to the second interval when the number of consecutive times that the power supply state denoted by the status information which has been acquired does not correspond to a sleep mode is larger than or equal to n, where n, which is a threshold value, is an integer greater than or equal to 2.

15. A non-transitory computer-readable recording medium which stores a monitoring program for acquiring, at a monitoring timing, device information which is a target of collection from a device, the monitoring program causing a computer to realize
- a status information acquisition function of acquiring from the device, status information that includes information representing a power supply state of the device; and
- a monitoring interval setting function of setting a monitoring interval which is an interval of the monitoring timing in accordance with the power supply state denoted by the status information which has been acquired,
- wherein in the setting of the monitoring interval, a setting of the monitoring interval is made longer than a current setting when the power supply state denoted by the status information which has been acquired corresponds to a sleep mode, and
- in the setting of the monitoring interval, the setting of the monitoring interval is not made longer than the current setting when the setting of the monitoring interval reaches an upper limit.

16. A method for acquiring, at a monitoring timing, device information which is a target of collection from a device, the monitoring method comprising:
- acquiring from the device, status information that includes information representing a power supply state of the device; and
- setting a monitoring interval which is an interval of the monitoring timing in accordance with the power supply state denoted by the status information which has been acquired,
- wherein in the setting of the monitoring interval, a setting of the monitoring interval is made shorter than a current setting when the number of consecutive times that the power supply state denoted by the status information which has been acquired does not correspond to a sleep mode is larger than or equal to n, where n, which is a threshold value, is an integer greater than or equal to 2.

17. A method for acquiring, at a monitoring timing, device information which is a target of collection from a device, the monitoring method comprising:
- acquiring from the device, status information that includes information representing a power supply state of the device; and
- setting a monitoring interval which is an interval of the monitoring timing in accordance with the power supply state denoted by the status information which has been acquired,
- wherein in the setting of the monitoring interval, a setting of the monitoring interval is made shorter than a current setting when the power supply state denoted by the status information which has been acquired does not correspond to a sleep mode, and
- in the setting of the monitoring interval, the setting of the monitoring interval is not made shorter than the current setting when the setting of the monitoring interval reaches a lower limit.

18. A non-transitory computer-readable recording medium which stores a monitoring program for acquiring, at a monitoring timing, device information which is a target of collection from a device, the monitoring program causing a computer to realize
- a status information acquisition function of acquiring from the device, status information that includes information representing a power supply state of the device; and
- a monitoring interval setting function of setting a monitoring interval which is an interval of the monitoring timing in accordance with the power supply state denoted by the status information which has been acquired,
- wherein in the setting of the monitoring interval, a setting of the monitoring interval is made shorter than a current setting when the number of consecutive times that the power supply state denoted by the status information which has been acquired does not correspond to a sleep mode is larger than or equal to n, where n, which is a threshold value, is an integer greater than or equal to 2.

19. A non-transitory computer-readable recording medium which stores a monitoring program for acquiring, at a monitoring timing, device information which is a target of collection from a device, the monitoring program causing a computer to realize
- a status information acquisition function of acquiring from the device, status information that includes information representing a power supply state of the device; and
- a monitoring interval setting function of setting a monitoring interval which is an interval of the monitoring timing in accordance with the power supply state denoted by the status information which has been acquired,
- wherein in the setting of the monitoring interval, a setting of the monitoring interval is made shorter than a current setting when the power supply state denoted by the status information which has been acquired does not correspond to a sleep mode, and
- in the setting of the monitoring interval, the setting of the monitoring interval is not made shorter than the current setting when the setting of the monitoring interval reaches a lower limit.

* * * * *